United States Patent
Husberg et al.

(10) Patent No.: US 10,710,451 B2
(45) Date of Patent: Jul. 14, 2020

(54) TANK CLOSURE

(71) Applicant: Hella GmbH & Co. KGaA, Lippstadt (DE)

(72) Inventors: Olaf Husberg, Warburg (DE); Henning Irle, Lippstadt (DE); Ingo Niemeyer, Moehnesee (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 66 days.

(21) Appl. No.: 16/135,426

(22) Filed: Sep. 19, 2018

(65) Prior Publication Data

US 2019/0084412 A1 Mar. 21, 2019

(30) Foreign Application Priority Data

Sep. 19, 2017 (DE) .......................... 10 2017 121 673

(51) Int. Cl.
*B60K 15/04* (2006.01)
*B60K 15/05* (2006.01)
(52) U.S. Cl.
CPC .. *B60K 15/0406* (2013.01); *B60K 2015/0451* (2013.01); *B60K 2015/0461* (2013.01); *B60K 2015/0477* (2013.01); *B60K 2015/0515* (2013.01)
(58) Field of Classification Search
CPC ................ B60K 15/0406; B60K 15/05; B60K 2015/0422; B60K 2015/0425; B60K 2015/0451; B60K 2015/0507; B60K 2015/053; B60K 2015/0538;
(Continued)

(56) References Cited

U.S. PATENT DOCUMENTS 5,234,122 A 8/1993 Cherng
5,275,213 A * 1/1994 Perkins ................ B60K 15/035
141/286

(Continued)

FOREIGN PATENT DOCUMENTS

DE 19846498 A1 4/2000
DE 202004013094 U1 1/2006
(Continued)

OTHER PUBLICATIONS

Extract from 'Spiegel Online' (www.spiegel.de/auto/werkstatt/neuer-tankverschluss-wie-in-der-boxengasse-a-216770.html), Oct. 7, 2002, "Neuer Tankverschluss Wie in der Boxengasse".

(Continued)

*Primary Examiner* — Jessica Cahill
*Assistant Examiner* — Christopher M Afful
(74) *Attorney, Agent, or Firm* — Muncy, Geissler, Olds & Lowe, P.C.

(57) ABSTRACT

A closure of a tank of a motor vehicle for closing a filler neck gas- and fluid-tight, having a closure fastened to a flap, the flap being fastened to a vehicle body of the motor vehicle such that it is movable into an open or closed position, the closure including a seal, which causes the closure to close against the filler neck. The tank closure should be easy for a user to handle and have a relatively simple design and be economical to manufacture. This is achieved in that the seal is electromechanically or pneumatically adjustable with the aid of an actuator.

9 Claims, 1 Drawing Sheet

(58) Field of Classification Search
CPC .... B60K 2015/0461; B60K 2015/0477; B60K 2015/0515
USPC .......... 141/287, 350; 220/201, 86.2
See application file for complete search history.

(56) References Cited

U.S. PATENT DOCUMENTS

| | | | |
|---|---|---|---|
| 5,472,108 A * | 12/1995 | Skudlarek | B60K 15/05 220/86.2 |
| 5,524,786 A | 6/1996 | Skudlarek | |
| 6,053,992 A * | 4/2000 | Wu | F02M 59/44 148/402 |
| 6,193,093 B1 | 2/2001 | Brunner | |
| 6,478,360 B1 | 11/2002 | Reutter | |

FOREIGN PATENT DOCUMENTS

| | | | |
|---|---|---|---|
| EP | 0658484 A1 | 6/1995 | |
| WO | WO0029239 A1 | 5/2000 | |

OTHER PUBLICATIONS

U.S. Appl. No. 16/135,381, filed Sep. 19, 2018.
U.S. Appl. No. 16/135,521, filed Sep. 19, 2018.

* cited by examiner

TANK CLOSURE

This nonprovisional application claims priority under 35 U.S.C. § 119(a) to German Patent Application No. 10 2017 121 673.1, which was filed in Germany on Sep. 19, 2017, and which is herein incorporated by reference.

BACKGROUND OF THE INVENTION

Field of the Invention

The present invention relates to a closure of a tank of a motor vehicle for closing a filler neck gas- and liquid-tight, comprising a closure fastened to a flap, the flap being fastened to a vehicle body of the motor vehicle such that it is movable into an open or closed position, the closure including a seal, which causes the closure to close against the filler neck.

Description of the Background Art

In most motor vehicles, in particular passenger cars and small trucks, a pivoted flap is introduced into a vehicle body, behind which a filler neck is disposed, e.g. for a fuel tank. The flap is preferably flush with the vehicle body to avoid disturbing the overall optical impression and the aerodynamics. The filler neck is separately closed in a sealing manner with the aid of a cover; for example, annular disk seals and screw threads or bayonet joints are provided for this purpose. To fuel the motor vehicle, the flap and then the cover must first be opened, and both must be closed again in reverse order after fueling. This is relatively complex. In addition, it is possible to forget to close the cover, and the latter may then get lost.

Methods are known (http://www.spiegel.de/auto/werkstatt/neuer-tankverschluss-wie-in-der-boxengasse-a-216770.html) for designing a closure for a filler neck of a motor vehicle without a cover. For this purpose, a hood made from an elastic material is fastened to the inside of a flap assigned to the filler neck, which is pressed against an area surrounding the filler neck when the flap is closed. In addition, a filling opening is closed with the aid of a spring-loaded sealing flap. The closure does not ensure a complete tightness. In addition, a relatively great contact pressure must be ensured by the flap, so that the entire structure must be designed to be correspondingly stable and heavy.

A closure for a filler neck is disclosed in U.S. Pat. No. 5,234,122 A, in which a cover as the closure may be opened together with an assigned flap with the aid of an electric motor. A very complex mechanism is provided for this purpose, which is made up of many individual parts and is correspondingly expensive to manufacture and mount.

U.S. Pat. No. 5,524,786 A shows a plug-like tank closure, which is detachably fastened to a filler neck, e.g. with the aid of detents. The detents are lockable and unlockable with the aid of an electric drive. During unlocking, a spring presses the tank closure outwardly. A cover, which is flush with a vehicle body when the tank closure is locked, is fastened at the outer longitudinal end thereof. As a result, a flap is not provided. The tank closure is bulky and complex.

A plug-like tank closure is known from EP 658 484 A1, which corresponds to U.S. Pat. No. 5,472,108, which is lockable in a closed and an intermediate position. Opening the tank closure is associated with additional complexity due to the intermediate lock. A flap is not present.

WO 00/29239 A1, which corresponds to U.S. Pat. No. 6,478,360, discloses a closure for a fuel tank, which is fastened to a flap. The closure comprises a cover portion and a plug-like insertion portion. The cover portion is used to seal the fuel tank in connection with a flat seal, and the insertion portion is used to lock the closure in connection with a contact element as well as an undercut formed in a filler neck. The closure is complex.

SUMMARY OF THE INVENTION

It is therefore an object of the present invention to provide a tank closure, which is easy for a user to handle and has a relatively simple design and is economical to manufacture.

The seal can be electromechanically or pneumatically adjustable. The seal may be used, on the one hand, for its actual purpose—namely to close the filler neck gas- and fluid-tight—and, on the other hand, as a lock for preventing unauthorized opening of the closure.

The handling by driver during fueling of a motor vehicle is very easy: He only has to open the flap; the closure is thus removed from the filler neck without any further action, so that a fuel pump nozzle may be inserted. To end the fueling, only the flap needs to be closed after the fuel pump nozzle is removed.

The means for adjusting the seal, i.e. the actuator, are easy and correspondingly economical to manufacture. They comprise, for example, an electric motor, an electromagnetic drive, an electroactive polymer, an electrically influenceable shape memory alloy or an electrically influenceable shape memory polymer. The means are driven, for example with the aid of a switch or a sensor.

The closure may be designed as a cover or as a plug. The seal is fastened to either the closure or the filler neck. The filler neck is manufactured from an elastic and/or rigid material.

The closure can be designed as a plug, one part of which is designed as the seal. The plug extends into the filler neck when the fuel tank is closed. A length of the plug is dimensioned in such a way that it may be pulled out of the filler neck without problems upon opening the flap, to which it is preferably fastened in an articulated manner.

The seal is formed on the plug in such a way that it is able to interact with an inner wall of the filler neck. A clearance between the wall and the seal is selected to be as small as possible, so that, on the one hand, an insertion into or removal of the plug from the filler neck is not disturbed when the seal is set for opening and, on the other hand, the adjustment of the seal for sealing purposes is associated with preferably short distances.

The plug, including the seal, is easy and light-weight to manufacture and may be assembled with little complexity. The means for adjusting the seal may be easily integrated into the seal and connected, e.g. electrically.

A retaining ring can be disposed on an inner wall of the filler neck. The seal is, on the one hand, easier to reach hereby, because it is already sufficient if the seal is pressed against the retaining ring. On the other hand, the holding forces are increased against a removal of the plug when the closure is closed, so that an unauthorized opening of the flap and thus theft of fuel is at least made more difficult.

The seal can be disposed on a free end of the closure. This makes it possible to design the plug with a short overall length, so that material and weight may be spared.

A mechanically adjusted cross section of the seal is reduced in size. This means that the filler neck is sealed without the adjustment, i.e. without any mechanical application of force. The mechanical adjustment must be activated only for fueling purposes. This reduces wear and energy consumption on the part of the actuator.

The adjustment of the seal takes place by changing its shape in the manner of an artificial muscle. The cables needed for this purpose are easily laid.

The adjustment of the seal can be pneumatic, preferably with the aid of underpressure. Relatively high forces may be applied hereby, so that sealing and holding forces may be correspondingly high.

The closure can be fastened to the flap in an articulated manner. This makes the closure easier for a user to handle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The exemplary embodiment illustrated in FIG. 1 relates to a closure of a fuel tank 1 of a motor vehicle, in which a closure 4 is designed as a plug 4. One part of plug 4 is designed as a seal 3, which may be changed from an initial size (zero cross section) to an open size.

Figure 1A:
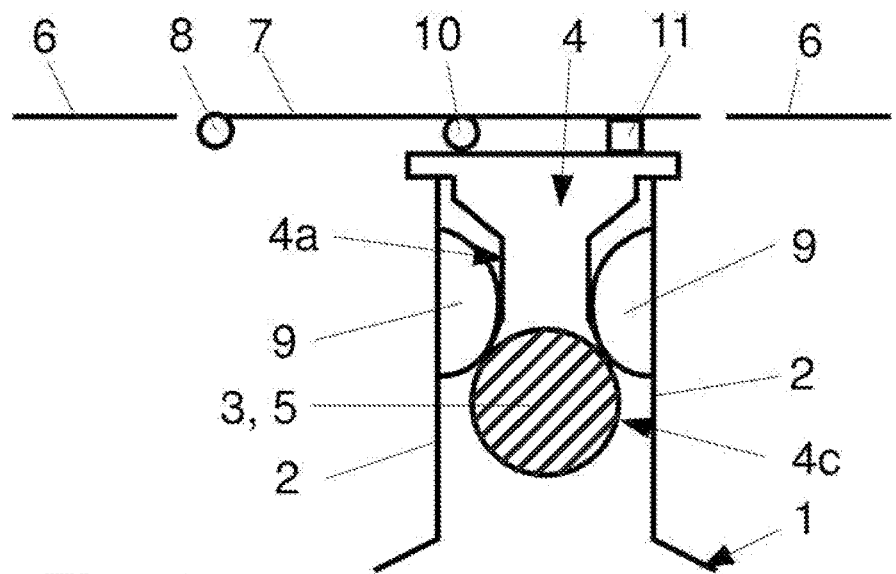
FIGS. 1a and 1b show a cross section of a closure comprising a plug, one part of which is designed as a seal, in a closed position an in an open position.
Figure 1B:
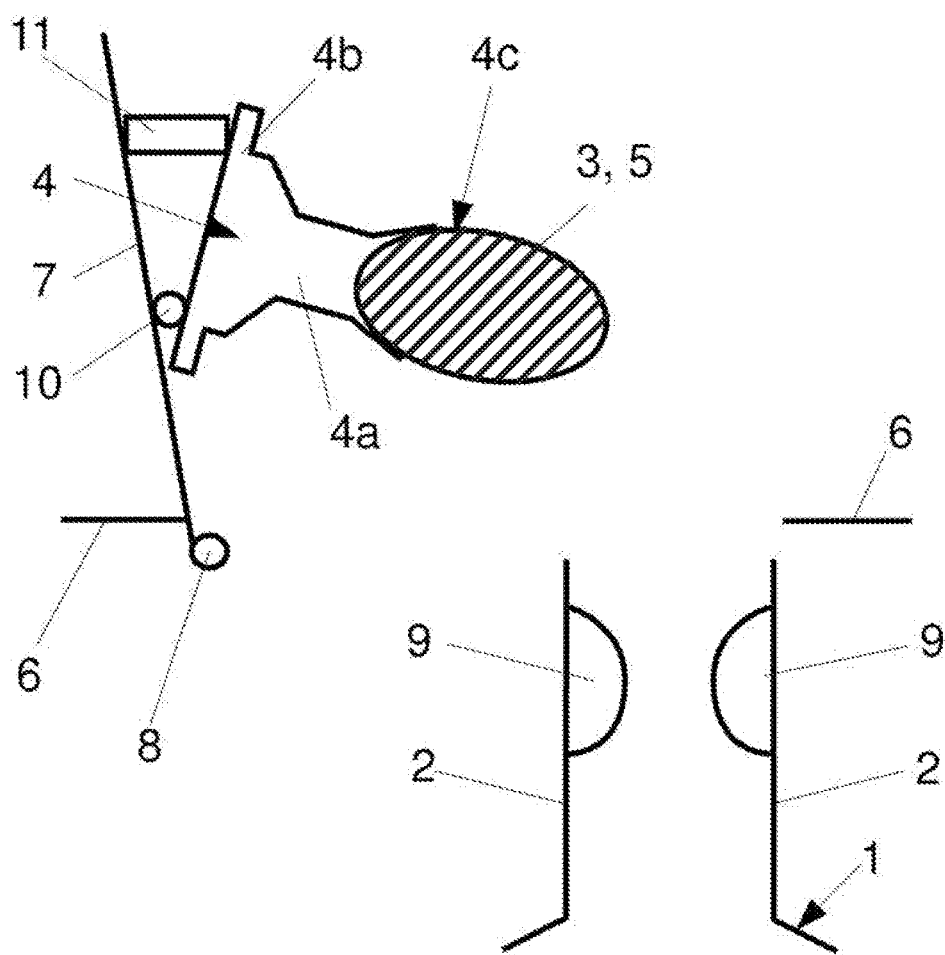

FIG. 1a shows the closure with filler neck 2 in a closed state, and FIG. 1b shows the closure with the filler neck in the open state, i.e. plug 4 is situated in filler neck 2 or outside the latter.

Tubular filler neck 2 has a circular cross section and is manufactured from a hard material. A retaining ring 9 is disposed on an inner wall of filler neck 2 in its upper area assigned to its opening. Retaining ring 9 forms a constriction of the inner cross section of filler neck 2 and is preferably formed as a single piece therewith as a material application. Retaining ring 9 forms one part of the inner wall of filler neck 2. A cross section of retaining ring 9 is in the shape of a circular segment; alternatively, retaining ring 9 is shaped as a circle arc by means of constriction, the wall thickness of filler neck 2 remaining approximately the same.

Plug 4 is fastened in an articulated manner to a flap 7, which is disposed on a vehicle body 6 of the motor vehicle such that it is pivotable into an open or a closed position with the aid of a hinge 8, for example. The open position of flap 7 corresponds to opened filler neck 2, and the closed position corresponds to closed filler neck 2.

The articulated fastening of plug 4 to flap 7 includes a joint 10 as well as an elastic element 11, in the form of a spring, for example. In this way, it is ensured that closure 4 is largely coaxially aligned with filler neck 2 in the direct vicinity thereof. This prevents a tilting of closure 4 during the opening or closing of the closure.

Plug 4 is designed with a circular cross section, which is widened at its ends with respect to a central part; or in other words, the central part of plug 4 has a tapering 4a. A first end, which is fastened to flap 7, is designed in the manner of a cover 4b, and a second free end, which extends into filler neck 2 when the latter is closed, is designed in the form of a spherical section 4c. Spherical section 4c is simultaneously designed as seal 3. Plug 4 is conically shaped as a transition between cover 4b and tapering 4a. The following applies to diameter Ø of the cross sections of the plug: Ø tapering 4a<Ø spherical section 4c<Ø cover 4b.

Cover 4b and tapering 4a are manufactured from a hard material.

When the closure is closed, spherical section 4c is disposed relative to retaining ring 9 in such a way that a center point of spherical section 4c is situated in a half of retaining ring 9 (viewed in the direction of the longitudinal axis of filler neck 2) facing tank 1. A secure seal and a firm hold of plug 4 is ensured hereby.

Spherical section 4c is formed from an electroactivatable polymer, deformable as an electromechanical actuator 5 in the manner of an artificial muscle, and covered with an elastic fuel-resistant material, such as NBR (nitrile butadiene rubber) or FHP (fluorinated hydrocarbon polymer). When actuator 5 is inactive, spherical section 4c forms the spherical shape which is deformed into an ellipsoid of revolution by active actuator 5. A longitudinal axis of the ellipsoid of revolution is coaxial to a longitudinal axis of plug 4, and a maximum diameter of the ellipsoid of revolution radial to the longitudinal axis is smaller than the smallest inner diameter of retaining ring 9, so that plug 4 may be pulled out of filler neck 2 without problems when actuator 5 is active.

Alternatively, actuator 5 may be designed as a vacuum pump having corresponding suction lines. Spherical section 4c is manufactured in the manner of a balloon, which automatically assumes the spherical shape when actuator 5 is inactive.

Any other shape of a widening with respect to central part of plug 4 may be used instead of spherical section 4c. The deformation of the widening by actuator 5 then takes place similarly to the above description.

Alternatively to the drawing and the above description, retaining ring 9 may also be designed, for example, in the manner of a thick-walled tube section.

An operation of the closure is handled and controlled as follows:

To open the closure, actuator 5 is driven in such a way that spherical section 4c is deformed into the ellipsoid of revolution, and closure 4 is released for opening thereby. The driving action is activated, for example, by pressing a pushbutton in the interior of the motor vehicle or by pressing flap 7 which actuates a so-called push-push mechanism or a pushbutton for this purpose. Alternatively the driving action is activated with the aid of a sensor, which detects gestures or, upon pressing flap 7, e.g. a change in pressure (e.g. in spherical section 4c) and generates corresponding control signals. In another alternative, flap 7 is opened and closed electromotively.

In the case of alternative actuator 5, the vacuum pump is switched on. Balloon-like spherical section 4c is compressed by the ambient pressure, and its cross section is reduced in size.

Flap 7 can now be opened manually in the usual manner, plug 4 being pulled out of filler neck 2 at the same time.

The actual fueling may then begin after inserting a fuel pump nozzle into filler neck 2.

After the fueling is complete, the fuel pump nozzle is removed and flap 7 is closed, plug 4 being simultaneously inserted into filler neck 2. Actuator 5 is driven in such a way that the spherical shape of seal 3, and thus the necessary seal, is reestablished. The driving action is activated either manually, using the means mentioned above for opening, or automatically, e.g. with the aid of a sensor or RFID (radio frequency identification).

Actuator 5 may simultaneously also detect an attempt to forcibly open the closure and emit a corresponding alarm signal via an evaluation device.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A closure component for a tank of a motor vehicle for closing a filler neck gas- and fluid-tight, the closure component comprising: a closure fastened to a flap, the flap being fastened to a vehicle body of the motor vehicle such that the flap and the closure are movable into an open position or a closed position, the closure including a seal, which causes the closure to close against the filler neck, wherein a size or shape of the seal is electromechanically or pneumatically adjustable with the aid of an actuator, such that the seal is adjusted between an open state in which the closure is movable from the closed position to the open position and a closed state in which the closure is inhibited from moving from the closed position to the open position, and wherein a retaining ring is disposed on an inner wall of the filler neck, such that the retaining ring projects into an interior of the filler neck, wherein the closure is inserted through the retaining ring when the closure is moved from the open position to the closed position, such that the retaining ring surrounds at least a portion of the closure when the closure is in the closed position, and wherein the retaining ring blocks the closure from moving from the closed position to the open position when the seal is in the closed state and wherein the closure is freely movable from the closed position to the open position when the seal is in the open state.

2. The closure component according to claim 1, wherein the closure is a plug, one part of which is designed as the seal.

3. The closure component according to claim 1, wherein the seal is disposed on a free end of the closure.

4. The closure component according to claim 1, wherein a the adjustment of the seal causes a cross section of the seal to decrease or increase in size depending upon whether the seal is to be in the open state or the closed state, such that when the seal is in the open state, the cross section of the seal is smaller than when the seal is in the closed state.

5. The closure component according to claim 1, wherein the adjustment of the seal takes place by changing the shape of the seal.

6. The closure component according to claim 1, wherein the adjustment of the seal takes place pneumatically.

7. The closure component according to claim 1, wherein the closure is fastened to the flap by a pivot joint, such that the closure is pivotable with respect to the flap.

8. The closure component according to claim 1, wherein the retaining ring is stationarily fixed with respect to the inner wall of the filler neck, such that the retaining ring remains stationary when the closure is moved from the closed position to the open position.

9. The closure component according to claim 1, wherein the retaining ring blocks the closure from moving from the closed position to the open position when the seal is in the closed state since the seal, when in the closed state, is wider than an opening encircled by the retaining ring and wherein the closure is freely movable from the closed position to the open position when the seal is in the open state, since the seal, when in the open state, is narrower than the opening encircled by the retaining ring.

* * * * *